United States Patent
Wilson et al.

(10) Patent No.: US 9,003,411 B2
(45) Date of Patent: Apr. 7, 2015

(54) AUTOMATED PROVISIONING AND CONFIGURATION OF VIRTUAL AND PHYSICAL SERVERS

(75) Inventors: Christopher J. Wilson, Owings Mills, MD (US); Robert F. Novak, Catonsville, MD (US); Patrick M. Joanny, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1021 days.

(21) Appl. No.: 12/465,325

(22) Filed: May 13, 2009

(65) Prior Publication Data

US 2010/0293544 A1 Nov. 18, 2010

(51) Int. Cl.
*G06F 9/50* (2006.01)
*G06F 9/46* (2006.01)
*G06F 9/48* (2006.01)
*G06F 9/455* (2006.01)
*G06F 9/44* (2006.01)

(52) U.S. Cl.
CPC .......... *G06F 9/4401* (2013.01); *G06F 9/45558* (2013.01); *G06F 2009/45562* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,340,520 B1 * | 3/2008 | Jordan et al. | 709/226 |
| 7,577,722 B1 * | 8/2009 | Khandekar et al. | 709/220 |
| 7,703,102 B1 * | 4/2010 | Eppstein et al. | 718/104 |
| 8,352,608 B1 * | 1/2013 | Keagy et al. | 709/226 |
| 8,468,535 B1 * | 6/2013 | Keagy et al. | 718/104 |
| 2002/0156984 A1 * | 10/2002 | Padovano | 711/148 |
| 2003/0069974 A1 * | 4/2003 | Lu et al. | 709/226 |
| 2003/0163589 A1 * | 8/2003 | Bunce et al. | 709/250 |
| 2004/0078458 A1 * | 4/2004 | Rolia | 709/223 |
| 2005/0120160 A1 * | 6/2005 | Plouffe et al. | 711/1 |
| 2005/0172093 A1 * | 8/2005 | Jain | 711/162 |
| 2006/0174087 A1 * | 8/2006 | Hashimoto et al. | 711/173 |
| 2007/0088980 A1 * | 4/2007 | Greenspan et al. | 714/13 |
| 2007/0177612 A1 * | 8/2007 | Kubota | 370/395.52 |
| 2007/0180314 A1 * | 8/2007 | Kawashima et al. | 714/15 |
| 2007/0234337 A1 * | 10/2007 | Suzuki et al. | 717/168 |
| 2007/0271561 A1 * | 11/2007 | Winner et al. | 718/1 |
| 2008/0059610 A1 * | 3/2008 | Lin et al. | 709/220 |
| 2008/0109542 A1 * | 5/2008 | Ferri et al. | 709/222 |
| 2008/0244579 A1 * | 10/2008 | Muller | 718/100 |
| 2009/0204961 A1 * | 8/2009 | DeHaan et al. | 718/1 |
| 2009/0300605 A1 * | 12/2009 | Edwards et al. | 718/1 |
| 2009/0327211 A1 * | 12/2009 | McCune et al. | 707/1 |
| 2009/0327471 A1 * | 12/2009 | Astete et al. | 709/223 |
| 2010/0042720 A1 * | 2/2010 | Stienhans et al. | 709/226 |
| 2010/0058332 A1 * | 3/2010 | DeHaan | 717/177 |
| 2010/0131649 A1 * | 5/2010 | Ferris | 709/226 |
| 2010/0293269 A1 * | 11/2010 | Wilson et al. | 709/224 |

* cited by examiner

*Primary Examiner* — Emerson Puente
*Assistant Examiner* — Benjamin Wu (57) ABSTRACT

A system may receive a request to create a virtual machine, create the virtual machine on a first physical server in response to the request, and receive parameters for configuring a second physical server. The system may also configure the second physical server in accordance with the parameters during an installation of an operating system on the second physical server, and notify a user that the second physical server is ready for use.

20 Claims, 8 Drawing Sheets

AUTOMATED PROVISIONING AND CONFIGURATION OF VIRTUAL AND PHYSICAL SERVERS

BACKGROUND INFORMATION

An in-house system developer may sometimes purchase and stage devices to build a system. When purchasing the devices, the system developer may evaluate device specifications, price, and/or equipment compatibility in light of particular project requirements. When staging the devices, the system developer may install operating systems, applications, databases and web servers, may apply patches, and/or may configure the devices.

DETAILED DESCRIPTION OF PREFERRED EMBODIMENTS

The following detailed description refers to the accompanying drawings. The same reference numbers in different drawings may identify the same or similar elements.

As described below, a system may provision both virtual resources and physical resources. When a user wishes to obtain computing resources (e.g., a network, a server, an application, a web server, etc.), the user may connect to an integrated provisioning system via a web portal. Once connected via a web interface, the user may input parameters that describe the desired resources. Based on the parameters, the integrated resource provisioning system may provision and allocate virtual and/or physical resources without manual intervention from a system administrator or an operator.

Figure 1:
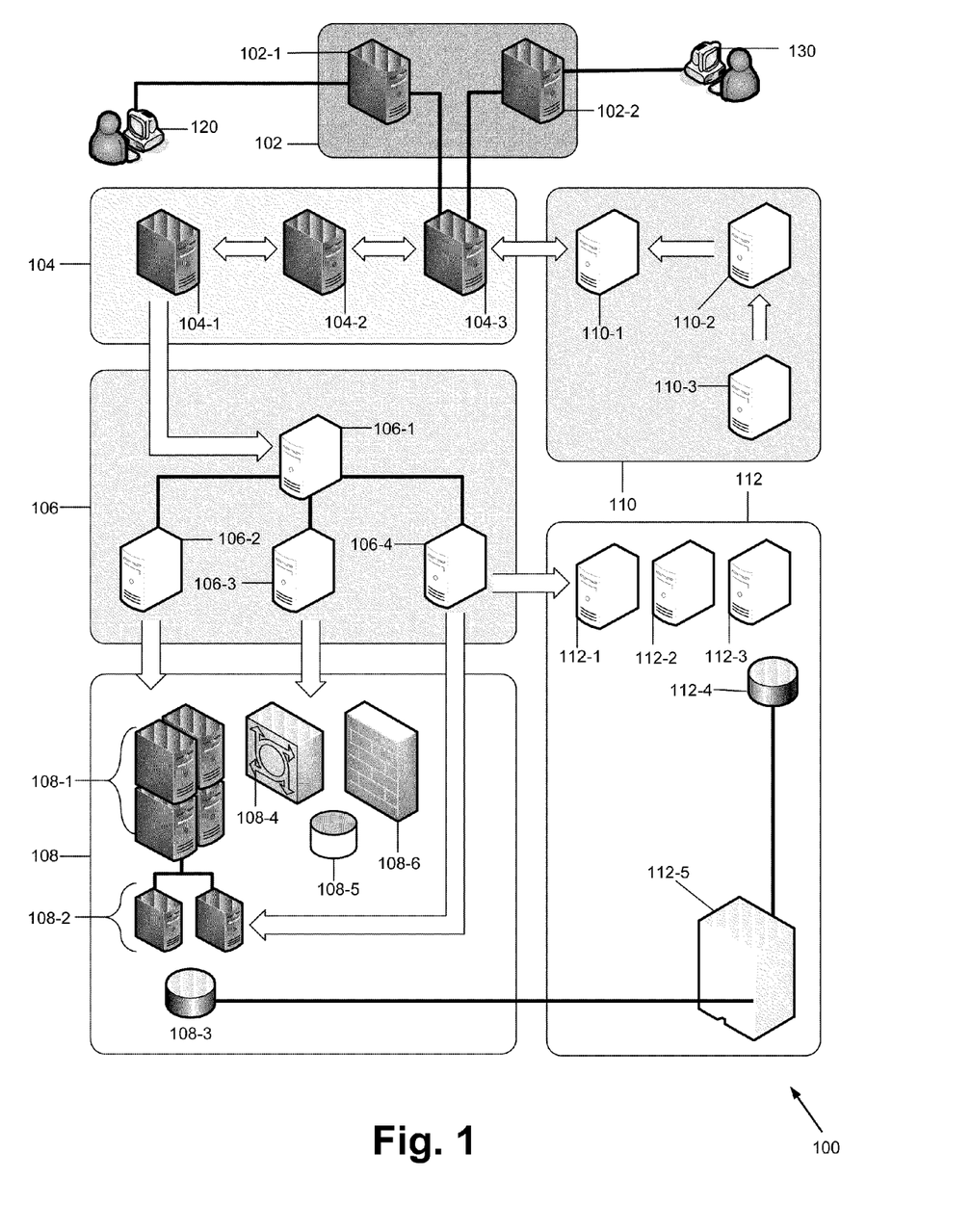
FIG. 1 is a diagram illustrating an exemplary network in which concepts described herein may be implemented.

FIG. 1 is a diagram illustrating an exemplary network in which concepts described herein may be implemented. In one implementation, network 100 may include one or more wired and/or wireless networks that are capable of exchanging information, such as voice, video, data, multimedia information, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include a presentation network 102, resource management network 104, workflow network 106, virtual system network 108, inventory management network 110, and physical resource network 112. For simplicity and ease of understanding, network 100 of FIG. 1 does not show other network or network components, such as bridges, routers, switches, wireless devices, etc. Depending on the implementation, network 100 may include additional, fewer, or different networks and/or network components.

Presentation network 102 may include devices that interact with users and system administrators. As further shown in FIG. 1, presentation network 102 may include an administrator portal device 102-1 and a user portal device 102-2. Administrator portal device 102-1 may interact with and relay information between a system administrator device, shown as item 120, and resource management network 104. Through the interaction, system administrator device 120 may perform system/network administration tasks (e.g., managing user accounts, performing an action that a user is not authorized to perform, etc.).

User portal device 102-2 may interact with and relay information between a user device, illustrated as item 130, and resource management network 104. User device 130 may access provisioning services that are available via user portal device 102-2. For example, user device 130 may request resource management network 104 to provide user device 130 with a set of virtual machines.

Resource management network 104 may provide provisioning services. In providing the provisioning services, resource management network 104 may track pools of resources that are available to user device 130, reserve a portion of the resources based on a request from user device 130, and allocate the reserved resources to user device 130. In addition, resource management network 104 may deallocate the resources (e.g., return the portion to the pool) when user device 130 indicates that the user does not need the resources.

In addition, resource management network 104 may provide support for administrative tasks (e.g., administer user, perform resource allocation tasks that a user is not authorized to perform, etc.).

As further shown in FIG. 1, resource management network 104 may include a job database device 104-1, resource manager database 104-2, and resource management device 104-3. Job database device 104-1 may receive a job description (e.g., a list of tasks) from resource management device 104-3 and store it in an active job queue until the job is performed. Resource manager database 104-2 may store and/or retrieve configuration/usage data pertaining to a particular user and/or other bookkeeping information.

Resource management device 104-3 may provision/de-provision resources based on inventory information provided by inventory management network 110. To provision/de-provision the resources, resource management device 104-3 may create description of a job based on user input relayed by user portal device 102-2, based on user configuration, and based on available resources. Resource management device 104-3 may handoff the job description to job database device 104-3, to be placed in the active job queue.

Workflow network 106 may perform jobs whose descriptions are in the active job queue at job database device 104-1. Once the job is performed, workflow network 106 may instruct job database device 104-1 to dequeue the job description. As further shown in FIG. 1, workflow network 106 may include a workflow engine device 106-1, virtual machine management (VMM) control device 106-2, network management device 106-3, and resource lifecycle management device 106-4.

Workflow engine device 106-1 may perform subtasks of a job as defined by a job description in the active job queue at job database device 104-1. In one implementation, workflow engine device 106-1 may poll the active job queue to detect the job description. Workflow engine device 106-1 may request job database device 104-1 to remove the job description from the queue when the subtasks are completed.

In performing each of the subtasks of a job, workflow engine device 106-1 may employ VMM control device 106-2, network management device 106-3, and/or resource lifecycle management device 106-4. Each of the subtasks in the job description may entail allocation, deallocation, controlling, and/or monitoring of virtual resources, physical resources, and/or network resources. For example, assume that user device 130 requests resource management device 104-3 to allocate a virtual machine. In response, resource management device 104-3 may create a job description that includes subtasks for creating a virtual machine, and place the job description at job database device 104-1. When workflow engine device 106-1 is about to perform the subtasks associated with creating the virtual machine, work flow engine device 106-1 may dispatch one or more requests for performing virtual machine-related functions to VMM control device 106-2 (e.g., a request to create the virtual machine). Possible requests that work flow engine device 106-1 may dispatch are further described below with reference to FIG. 5.

VMM control device 106-2, upon receiving requests from work flow engine device 106-1, may control and/or monitor one or more virtual machines by interacting with hypervisors. The term "hypervisor," as used herein, may refer to a program that monitors, creates, runs, removes, and/or controls a virtual machine (e.g., controls a lifecycle of a virtual machine) on a physical device. For example, when VMM control device 106-2 receives a request to create a virtual machine from work flow engine device 106-1, VMM control device 106-2 may issue a command to a hypervisor. The hypervisor may create the virtual machine on the host device.

Network management device 106-3 may perform network configuration functions on behalf of work flow engine device 106-1. The functions may include configuring network infrastructure components. FIG. 1 shows a number of different types of network objects that network management device 106-3 may manage, such as, for example, a virtual load balancer 108-4, virtual LAN 108-5, and virtual firewall 108-6. Virtual load balancer 108-4, virtual LAN 108-5, and virtual firewall 108-6 are further described below.

Resource lifecycle management device 106-4 may perform subtasks for provisioning a physical hardware device for the user. For example, resource lifecycle management device 106-4 may install an operating system on a server, install an application, etc. As shown in FIG. 1, resource lifecycle management device 106-4 may act on physical server devices 112-1 through 112-3 as well as virtual machines 108-2, as described below.

Virtual system network 108 may include devices and/or components for hosting and implementing virtual machine-related and network component-related resources that may be provisioned for the user. As shown, these resources may include a hypervisor cluster 108-1, virtual machines 108-2, logical volume 108-3, virtual load balancer 108-4, virtual LAN 108-5, and virtual firewall 108-6.

Hypervisor cluster 108-1 may include a logical group of hypervisors and a hypervisor manager (not shown). When hypervisor cluster 108-1 receives a command or a request from VMM control device 106-2 (e.g., create a virtual machine), the hypervisor manager may issue a command/request to a hypervisor. The hypervisor may then create the virtual machine on a host device on which the hypervisor is installed. Depending on the implementation, the hypervisor may be hosted on a hardware device without an operating system, or alternatively, may be hosted as a software component running on top of an operating system.

Virtual machines 108-2 may include a software emulation of a computer system (e.g., a server, a personal computer, etc.). Each virtual machine 108-2 may be instantiated, removed, and managed by a hypervisor. Once created, user device 130 may utilize virtual machine 108-2 as if it were a physical device.

Logical volume 108-3 may include storage on a network (e.g., network attached storage (NAS), a disk on storage area network (SAN), etc.). Logical volume 108-3 may be allocated as a resource by work flow engine 106-1. Once allocated, logical volume 108-3 may be mounted on a mount point on a virtual machine and used as storage (e.g., a file system, swap space, etc.). Virtual load balancer 108-4 may include an emulation of load balancer, and may be instantiated or removed upon demand from user device 130. The user may configure virtual load balancer 108-4 such that network traffic is distributed over the virtual and/or physical resources in accordance with specified thresholds (e.g., 40% of network traffic to one of virtual machines 108-2 and 60% of network traffic the other virtual machine). Virtual LAN 108-5 may be created upon demand from user device 130. User device 130 may configure and place selected virtual and physical resources on specific virtual LAN 108-5. Virtual firewall 108-6 may include an emulation of a physical firewall, and may be instantiated or deleted upon demand from user device 130. Once provisioned, virtual firewall 108-6 may be attached to virtual LAN 108-5 to protect the virtual and/or physical resources against undesired network traffic.

Inventory management network 110 may track inventory of network resources and provide inventory information to resource management network 104. As further shown in FIG. 1, inventory management network 110 may include IP address management device 110-1, data warehouse device 110-2, and an inventory management device 110-3.

IP address management device 110-1 may provision an IP address from a pool of IP addresses. In one implementation, in provisioning an IP address, IP address management device 110-1 may take into account network address translation schemes to identify which VLAN the IP address belongs to, such that an IP address conflict does not arise within the VLAN. When IP address management device 110-1 de-provisions an IP address, IP address management device 110-1 may return the IP address to a pool of IP addresses.

Data warehouse device 110-2 may include database of inventory of resources that are available for provisioning, resources that have been provisioned for the user, and configuration management information. When a resource is added to a pool, is provisioned, or is de-provisioned, data warehouse device 110-2 may update/record the information (e.g., inventory information) about the resource into the database. In addition, data warehouse device 110-2 may write and insert data associated with configuration (e.g., a version of an operating system that is installed on a provisioned physical server, an IP address, etc.) into the database when resource configuration changes.

Inventory management device 110-3 may obtain inventory and configuration related information by monitoring physical devices, and pass the information to data warehouse device 110-2.

Physical resource network 112 may include physical resources. These physical resources may be provisioned/de-provisioned upon a request from resource lifecycle management device 106-4. When physical resources in physical resource network 112 are provisioned/de-provisioned, resource lifecycle management device 106-4 or inventory management device 110-3 may update data warehouse device 110-2 with information about the provisioning and configuration information.

As further shown in FIG. 1, physical resource network 112 may include physical resources 112-1 through 112-3 (individually referred to as physical resource 112-x and collectively as physical resources 112-X), logical volume 112-4, and storage device 112-5. Physical resource 112-x may include a physical device or a component that may be provisioned via resource lifecycle management device 106-4. Logical volume 112-4 may include similar component as logical volume 108-3, and may operate similarly. Unlike logical volume 108-3 that is mounted on a virtual machine, however, logical volume 112-3 may be mounted on physical resource 112-x. Storage device 112-5 may include storage from which logical volumes (e.g., logical volume 108-3 or 112-4) may be allocated. Examples of storage device 112-5 may include a SAN disk and NAS devices.

In FIG. 1, although each of networks 102 through 112 are shown as including a number of devices, in an actual implementation, networks 102 through 112 may include additional, fewer, or different components than those shown in FIG. 1. In addition, depending on the implementation, functionalities of each of devices within networks 102-112 may be aggregated over fewer devices or distributed over additional devices. For example, in one implementation, functionalities of devices 112-1 through 112-3 in physical resource network 112 may be provided by a single server device.

Figure 2:
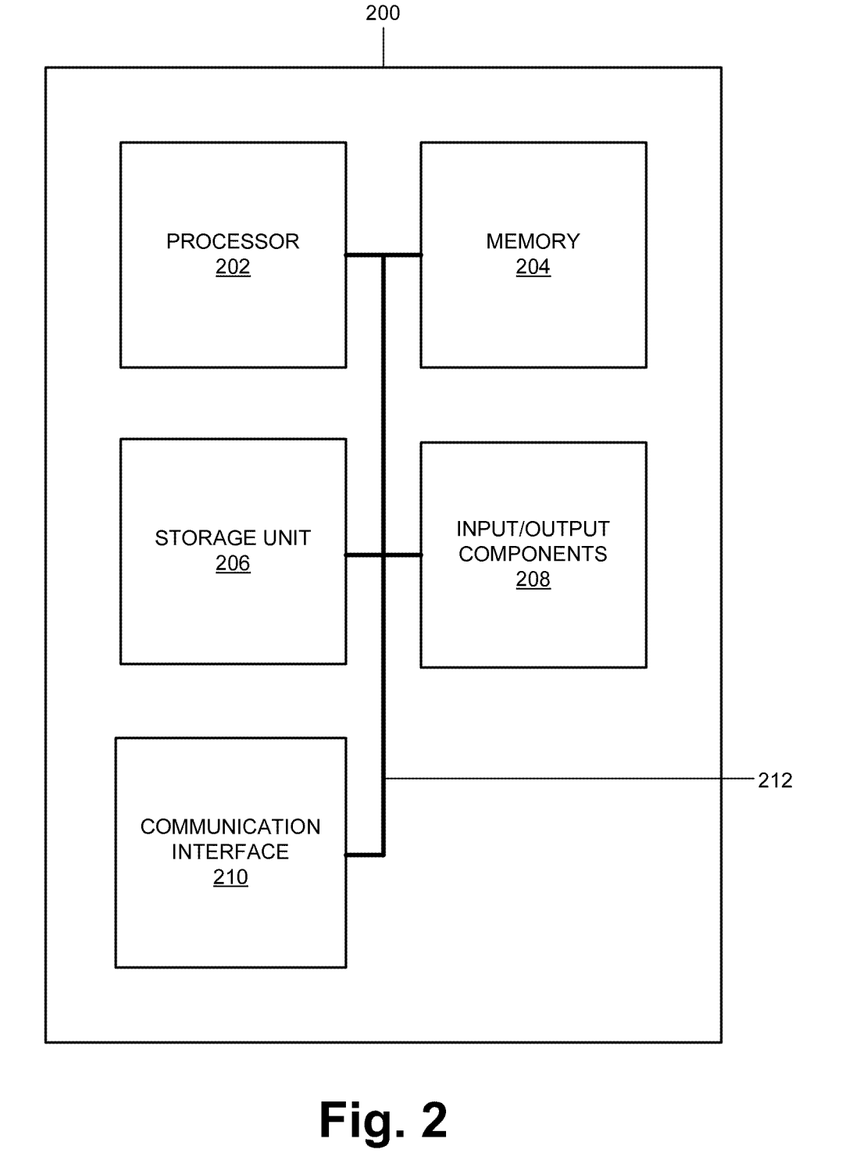
FIG. 2 is a block diagram of an exemplary network device shown in FIG. 1.

FIG. 2 is a block diagram of an exemplary network device 200. Network device 200 may be used to implement each of devices 104-1 through 104-3, 106-1 through 106-4, 110-1 through 110-3, 112-1 through 112-3, and 112-5. In addition, network device 200 may also be used to implement components of a device that hosts a hypervisor. As shown in FIG. 2, network device 200 may include a processor 202, memory 204, storage unit 206, input/output components 208, communication interface 210, and bus 212.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive. In some implementations, storage unit 206 may be part of another network device (e.g., storage device 112-5).

Input/output components 208 may include a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 200.

Communication interface 210 may include any transceiver-like mechanism that enables network device 200 to communicate with other devices and/or systems. For example, communication interface 210 may include mechanisms for communicating via a network. In these embodiments, communication interface 210 may include one or more network interface cards (e.g., an Ethernet interface) for communicating with other devices. In other implementations, communication interface 210 may include radio frequency (RF) transmitters, receivers and/or transceivers and one or more antennas for transmitting and receiving RF data. Bus 212 may provide an interface through which components of network device 200 can communicate with one another.

In FIG. 2, network device 200 is illustrated as including components 202-212 for simplicity and ease of understanding. In an actual implementation, network device 200 may include additional, fewer, or different components. For example, assuming that network device 200 is a virtual machine, components 202-212 may include virtual components. In another example, network device 200 may include one or more power supplies, fans, motherboards, video cards, etc.

Figure 3:
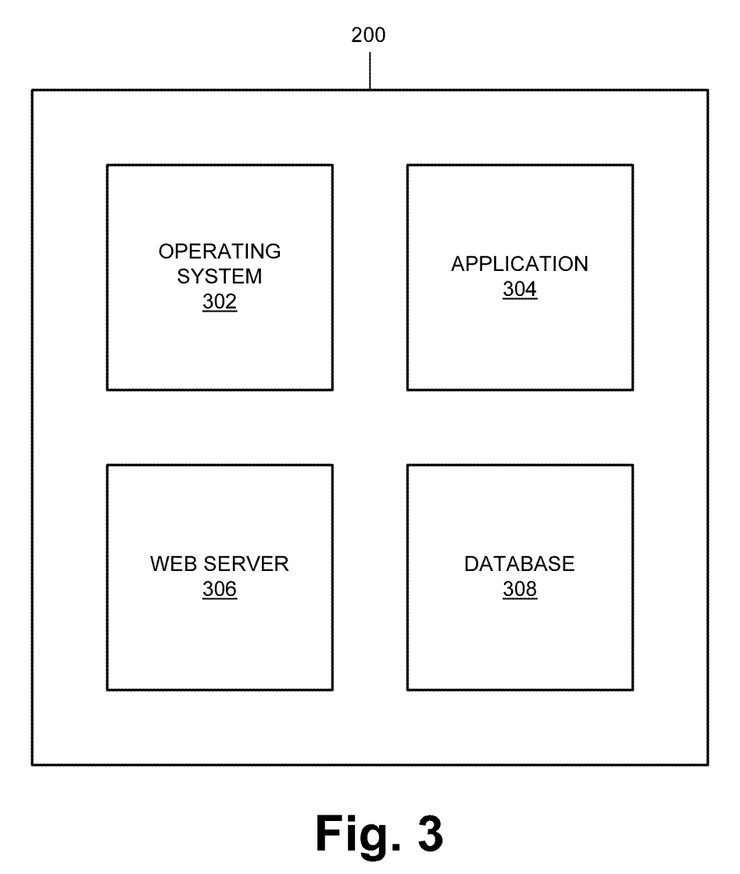
FIG. 3 is a block diagram illustrating exemplary functional components of the network devices shown in FIG. 1.

FIG. 3 is a block diagram illustrating exemplary functional components of network device 200. As shown, network device 200 may include an operating system 302, application 304, web server 306, and database 308. Depending on the implementation, network device 200 may include additional, fewer, or different components than those illustrated in FIG. 3.

Operating system 302 may manage hardware and software resources of network device 200. Operating system 302 may manage, for example, its file system, device drivers, communication resources (e.g., transmission control protocol (TCP)/IP stack), event notifications, etc.

Application 304 may include software program and/or scripts for rendering services. For example, in resource management device 104-3, application 304 may take the form of one or more programs for provisioning resources. Other examples of application 304 include a file transfer protocol (FTP) server, an email server, a telnet server, servlets, Java™ virtual machine (JVM), web containers, firewall, components to support Authorization, Authentication and Accounting (AAA), and other applications that either interact with client applications or operate in stand-alone mode. In addition, application 304 may include a specialized server program, application server, web page, etc.

Web server 306 may include a software application for exchanging web page related information with one or more browsers and/or client applications. Database 308 may include records and files and may act as an information repository for network device 200. For example, in resource manager database 104-2, database 308 may store and retrieve configuration/usage data pertaining to a particular user. In another example, database 308 in job database device 104-1 may implement persistent queues for storing job descriptions. In such implementations, the queue may be robust and, therefore, recoverable upon device failure.

Figure 4:
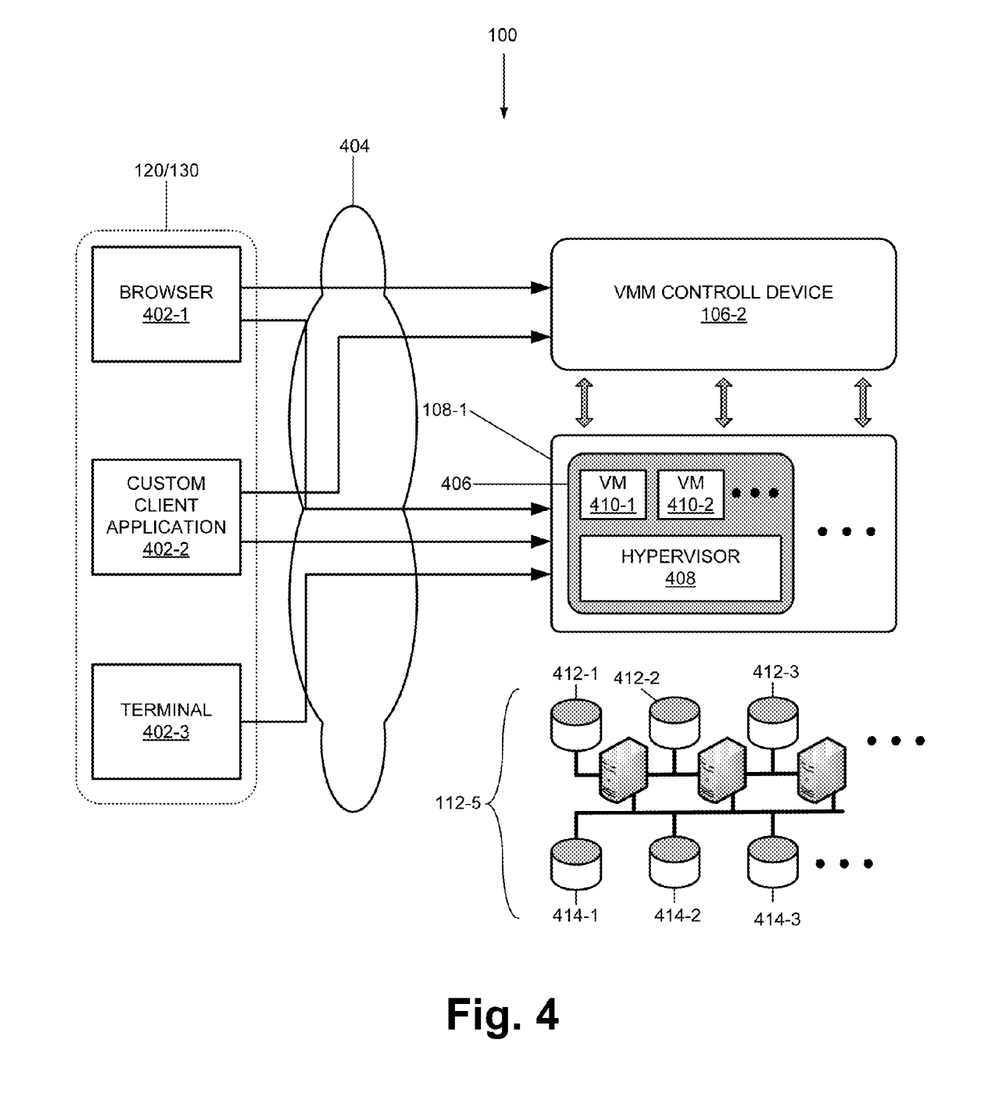
FIG. 4 illustrates interaction between a user device, VMM control device, hypervisor cluster, and storage device of FIG. 1 for provisioning and/or managing resources.

FIG. 4 illustrates interaction between administrator/user device 120/130, VMM control device 106-2, hypervisor cluster 108-1, and storage device 112-5 for provisioning and/or managing resources. As shown in FIG. 4, administrator/user device 120/130 may interact with VMM control device 106-2 and virtual cluster 108-1 over network 404. Network 404 may be part of network 100, and may include network or network devices, such as user portal device 102-2, resource management device 104-3, etc.

As further shown in FIG. 4, administrator/user device 120/130 may host different types of client applications, such as a browser 402-1, custom client application 402-2, and/or terminal 402-3 (e.g., xterm). Browser 402-1 may include a web browser (e.g., Internet Explorer, Firefox, etc.). Custom client application 402-2 may include a software component specifically designed for interacting with VMM control device 106-2 and/or hypervisor cluster 108-1. Terminal 402-3 may include a command line based client terminal for remotely accessing different services, such as telnet services, FTP services, etc.

As further shown, VMM control device 106-2 may interact with hypervisor cluster 108-1. Hypervisor cluster 108-1 may include a hypervisor manager (not shown) and one or more hypervisor devices 408. In hypervisor cluster 108-1, the hypervisor manager may administer/control hypervisor devices 408.

Each hypervisor device 408 may include a hypervisor 410 and virtual machines 410-1 through 410-3. Although FIG. 4 shows two virtual machines 410-1 and 410-2, in an actual implementation, hypervisor device 408 may include fewer or additional virtual machines that are instantiated and monitored by hypervisor 408 upon user demand.

For storage, each hypervisor device 408 may access logical volumes. As shown in FIG. 4, the logical volumes may be implemented with storage device 112-5. In one implementation, storage device 112-5 may include SAN disks 412-1, 412-2, 412-3, etc., and NAS devices 414-1, 414-2, 414-3, etc.

In FIG. 4, user device 130 may control, monitor, provision, or de-provision a virtual machine via browser 402-1. Through different devices (e.g., user portal device 102-2), a user's request for a service may reach VMM control device 106-2. VMM control device 106-2 may then carry out the user's request by performing a set of functions.

Figure 5:
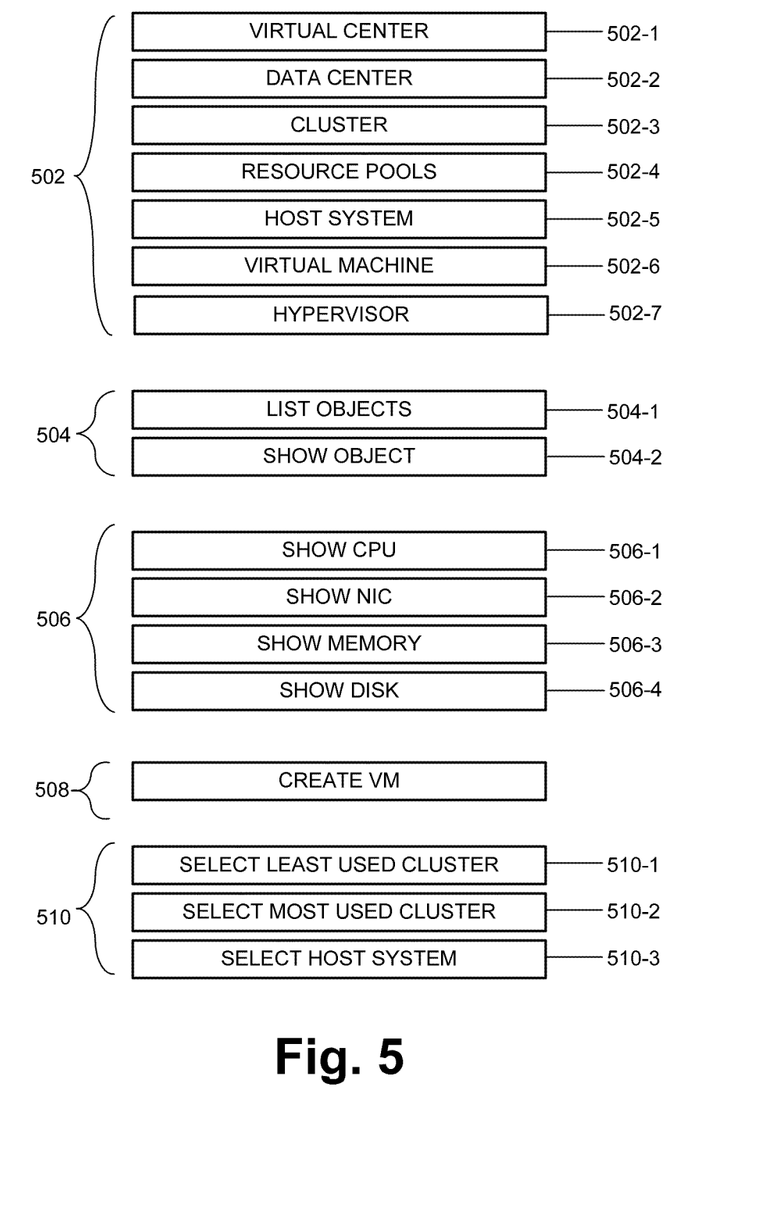
FIG. 5 is a list of exemplary functions that the VMM control device of FIG. 1 may support for provisioning and/or managing resources.

FIG. 5 is a list of exemplary functions that VMM control device 106-2 may support for provisioning and/or managing resources. As shown, VMM control device 106-2 may be requested to perform, by another device (e.g., workflow engine device 106-1), functions 504-1 through 510-3 on objects 502-1 through 502-7 (e.g., a software component) that are related to virtual machines. Depending on the implementation, VMM control device 106-2 may provide support for other functions and/or other types of objects.

Objects for which VMM control device 106-2 may provide support include virtual center 502-1, data center 502-2, cluster 502-3, resource pools 502-4, host system 502-5, virtual machine 502-6, and hypervisor 502-7. Virtual center 502-1 may include a collection of hypervisors 408 that are controlled or monitored by a hypervisor manager. Data center 502-2 may include a logical grouping of hypervisors and/or clusters of hypervisors. Cluster 502-3 may include a logical grouping of hypervisors. Resource pool 502-4 may include a group of hypervisor devices that aggregate CPU and/or memory capacity to be allocated to virtual machines on demand. Host system 502-5 may include a device for hosting a hypervisor. Virtual machine 502-6 may include a software emulation of a computer system. Hypervisor 502-7 may include a program that monitors, creates, runs, removes, and/or controls a virtual machine.

Functions 504 may include list objects function 504-1 and show object function 504-2. List objects function may request VMM control device 106-2 to provide a list of objects 502. For example, user device 130 may request VMM control device 106-2 to list virtual center 502-1. When VMM control device 106-2 receives the request, VMM control device 106-2 may provide a list of names of virtual centers within network 100. Show object function 504-2 may request VMM control device 106-2 to provide details that are related to object 502. For example, user device 130 may request VMM control device 106-2 to show a particular virtual center 502-1. In response to the request, VMM control device 106-2 may provide a version number of the hypervisor manager.

Show functions 506 may include show CPU 506-1, show NIC 506-2, show memory 506-3, and show disk 506-4. Show functions 506-1 through 506-4 may show a CPU usage, network usage, memory usage, and disk usage of a cluster, respectively.

Create VM 508 may create a new virtual machine within a data center 502-2. In requesting create VM, a device may also specify parameters for the virtual machine, such as the amount of memory for the virtual machine, number of CPUs to be used for the virtual machine, the name of the virtual machine, etc.

Select functions 510 may identify a specific object 502 among a group of objects 502. As shown, select functions 510 may include select least used cluster 510-1, select most used cluster 510-2, and select host system 510-3. Select least used cluster 510-1 and select most used cluster 510-2 may identify a cluster that is least used and a cluster that is most used within a portion of network 100. Select host system 510-3 may select an unused physical device in network 100 for hosting a hypervisor.

In the above, the functions that are listed in FIG. 5 may be used to manage, control, provision and/or de-provision virtual machines in virtual system network 108. Other network devices and/or networks 102-112 may use different functions to manage, control, provision and/or de-provision other types of resources (e.g., physical devices, machine access control (MAC) addresses, IP addresses, logical volume, etc.) and/or to control workflow processes.

Figure 6:
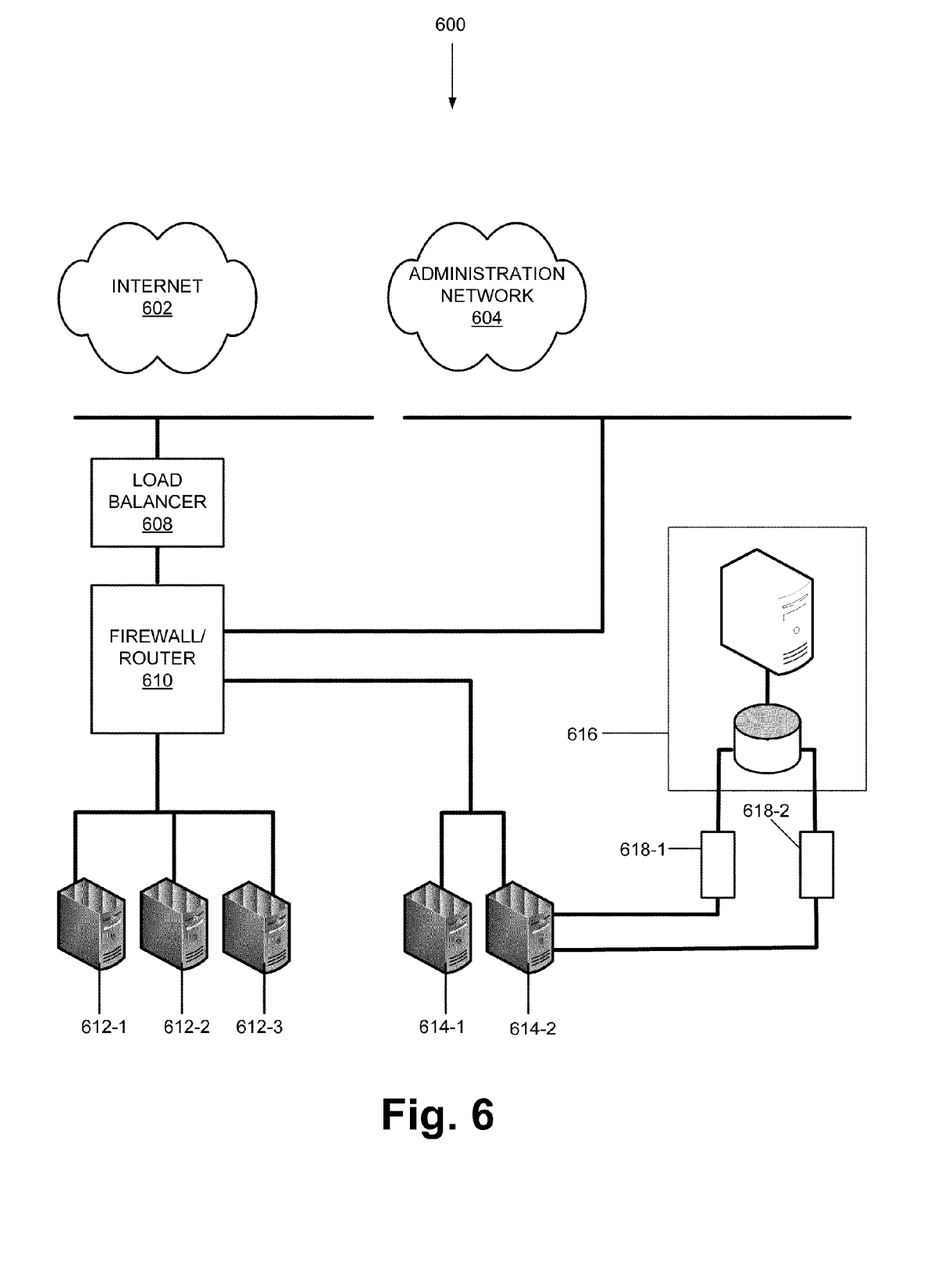
FIG. 6 is a diagram of exemplary resources that the system of FIG. 1 may provision.

FIG. 6 is a diagram of exemplary resources that network 100 of FIG. 1 may provision. As shown in FIG. 6, a user may be provisioned with connectivity to the Internet 602, administration network 604, load balancer 608, firewall/router 610, virtual server devices 612-1 through 612-3, physical server devices 614-1 and 614-2, storage device 616, and fiber channels 618-1 and 618-2.

Administration network 604 may provide services such as a backup service, security service, billing, etc. Load balancer 608 may balance network traffic over different devices (e.g., load balance between virtual server devices 612-1 through 612-3 and physical server devices 614-1 and 614-2). Firewall/router 610 may safeguard virtual server devices 612-1 through 612-3 and physical server devices 614-1 and 614-2 from outside networks via enforcement of firewall security rules and/or network address translation (NAT). Virtual server devices 612-1 through 612-3 may host applications in virtual environments. Physical server devices 614-1 and 614-2 may host applications in physical devices. Each of physical server devices 614 may access storage device 616 via one of two channels 618-1 and 618-2, which are provided for redundancy in case of a fiber channel failure.

The user at user device 130 may request network 100 to provision the user with one or more instances of network 600, each containing one or more components 608-618 and access to networks 602 and 604 via user portal device 102-2. For example, via a web interface, a user at user device 130 may specify number of virtual machines, physical devices, and/or network components for provisioning.

Figure 7:
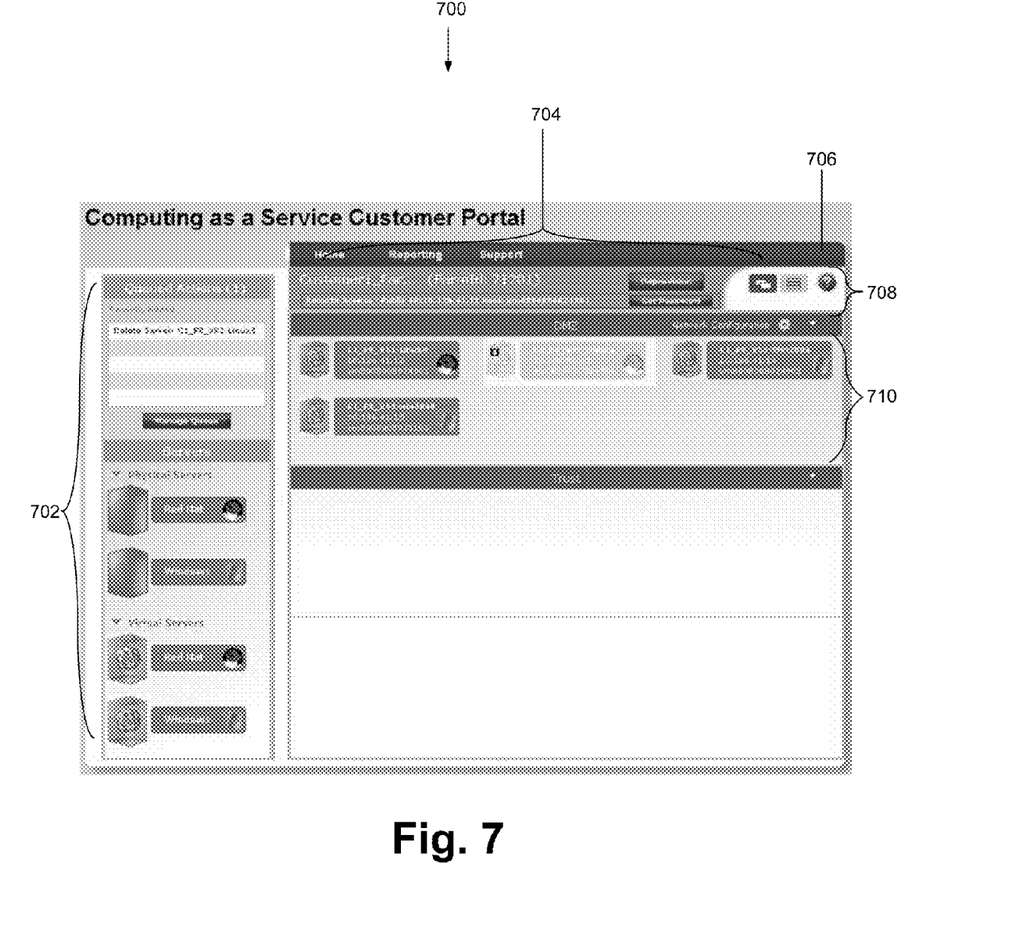
FIG. 7 illustrates an exemplary view of a web-based user interface for monitoring resources.

FIG. 7 illustrates an exemplary view 700 of a web-based user interface for controlling, monitoring, provisioning, and/or de-provisioning resources. More specifically, view 700 shows a web page for monitoring provisioned resources. Some features of a typical web browser, such as navigation bar, is not illustrated for the sake of ease in presentation.

As shown, the web page may include a side pane 702 and a main pane 704. Side pane 702 may include a list of servers and jobs that are pending. Main pane 704 may include menu bar 706, short cut buttons 708, and server display 710. Menu bar 706 may provide links to other web pages, such as "Home," "Reporting," or "Support" page. Short cut buttons 708 includes buttons for executing commands "deprovision" or "get password." Server display 710 may illustrate servers that are currently accessible. Depending on the implementation, the web page may include additional, fewer, or different features than those shown in FIG. 7.

Figure 8:
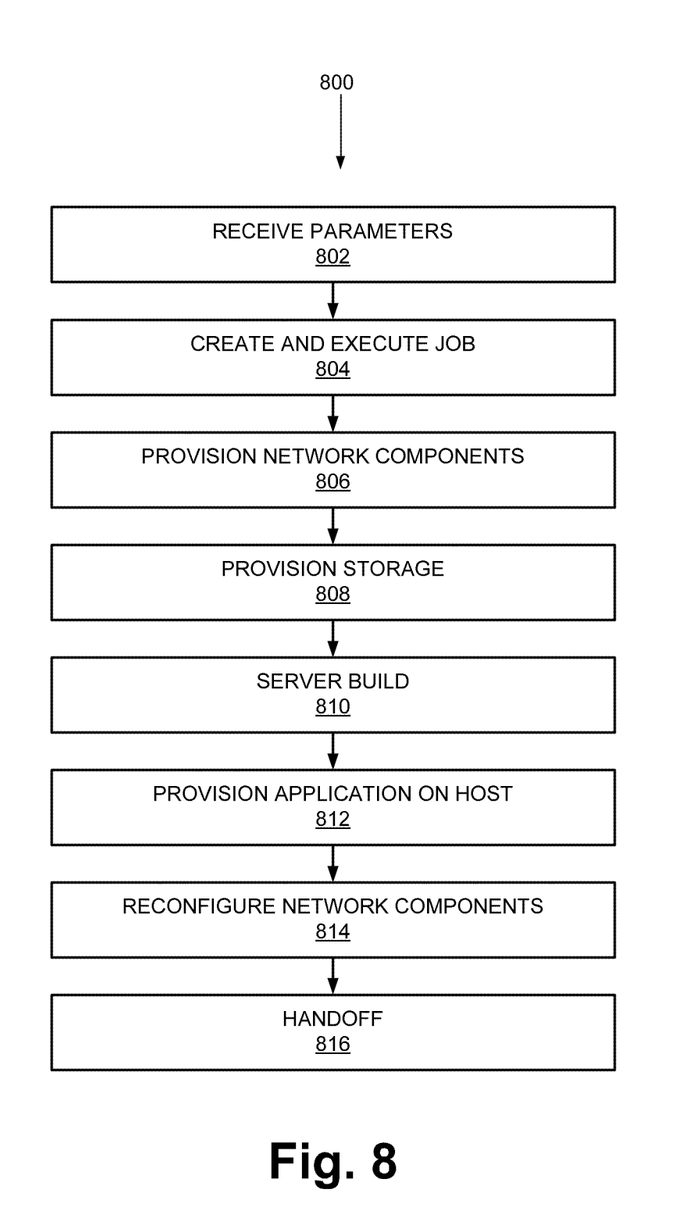
FIG. 8 is a flow diagram of an exemplary process that is associated with provisioning a physical server.

FIG. 8 is a flow diagram of an exemplary process that is associated with provisioning a physical server. Although networks 104-112 may implement other processes for provisioning de-provisioning, monitoring, and/or controlling other resources, they are not illustrated for the sake of simplicity and ease of understanding.

Process 800 may start at 802, where input parameters (e.g., disk space, operating system kernel parameters, semaphore count, limit on memory usage per process, etc.) may be received at user portal device 102-2 or resource management device 104-3 (block 802). Receiving the user input may entail validating the parameters, checking whether network 100 has enough capacity for provisioning, and/or transforming raw parameter that the user inputs into parameters that may easily be accessed by a device in networks 104-112. For example, a user may provide a specification for provisioning three virtual machines, each with 4 CPUs. The specification may be translated into a form that resource management device 104-3 can easily process. In another example, a user may request networks 104-112 to provision components of 10 physical server devices. Upon checking network capacity with inventory management network 110, resource management device 104-3 may determine that physical resource network 112 does not have a sufficient number of spare servers for provisioning. In such instances, resource management device 104-3 (or any other device handling the request) may generate an error message. In some implementations, such messages may be relayed back to the user.

Upon validating the input parameters, resource management device 104-3 may create a job description, and handoff the job description to job database device 104-1. Afterwards, workflow engine device 106-1, which polls/checks job database device 104-1, may detect the job description at job database device 104-1. Workflow engine 106-1 may perform a job that is associated with the job description.

Network components may be provisioned (block 806). In performing the provisioning, workflow engine 106-1 may request network management device 106-3 to provision network infrastructure components. For example, network management device 106-3 may provision a virtual LAN and configure the virtual network with its associated subnets and routing information. In another example, network management device 106-3 may provision a virtual load balancer or a virtual firewall.

In addition, a firewall may be provisioned. For example, in one implementation, a virtual firewall may be created on a host device and the IP address and/or the domain name of the physical server may be added to the list of server names in the firewall. In another implementation, an identifier for the physical server may be added to a rules database of an existing firewall.

Storage may be provisioned (block 808). In one implementation, workflow engine device 106-1 may provision the storage. In provisioning the storage, a server device may be zoned in the same area of network as the storage. Furthermore, a particular amount of disk space may be mapped to a logical volume and mounted on a physical server (e.g., network mounting) as a boot disk/volume.

Server build may be performed (block 810). The server build may include installing an operating system on the boot drive and configuring the operating system. In some implementations, the server build may entail installing patches, and/or configuring additional parameters (e.g., defining number of semaphores, setting memory size, etc.).

An application may be provisioned for the host device (block 812). After the completion of the server build, storage space for one or more applications may be provisioned. This may entail mounting a separate logical volume on the physical server. After allocating the storage space, the application may be installed in the allocated space. If necessary, additional patches may be applied.

Network components may be reconfigured (block 814). Depending on the application that is installed, network parameters may need to be re-set. For example, in one implementation, NIC port may need to be moved to an appropriate VLAN, and the Ethernet card may need to be reconfigured based on application specific network parameter values. In some implementations, the server name may be added to domain name server (DNS) database.

A reference (e.g., a network address or the DNS name of the physical server that has been provisioned) may be provided to the user (block 816). For example, a message may be sent to the user with the provisioning-related information (e.g., an indication that a physical device has been provisioned).

The above specification describes how a system may provision both virtual resources and physical resources. When a user wishes to obtain computing resources (e.g., a network, a server, an application, a web server, etc.), the user may connect to an integrated provisioning system via a web portal. Once connected via a web interface, the user may input parameters that describe the desired resources. Based on the parameters, the integrated resource provisioning system may provision and allocate virtual and/or physical resources without manual intervention from a system administrator or an operator.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIG. 8, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  receiving, via a web portal connection to an integrated provisioning system, parameters input by a user associated with a request for network resources, an identified number of virtual machines, and an identified number of physical server devices on a network;
  transforming the input parameters into one or more network parameter values for access by the integrated provisioning system;
  determining, based on the identified number of virtual machines and the identified number of physical server devices, that sufficient network capacity exists to provision the requested network resources;
  creating, by the integrated provisioning system, based on the one or more network parameter values and without manual intervention, at least one virtual machine on at least a first physical server device in response to determining that sufficient network capacity exists to provision the requested network resources, wherein the creating includes:
    instructing a hypervisor manager controller to select a least used cluster of hypervisors within a portion of the network, and
    instructing a hypervisor, of the selected cluster of hypervisors, to create the at least one virtual machine;
  configuring, by the integrated provisioning system, based on the one or more network parameter values and without manual intervention, at least a second physical server device in response to determining that sufficient network capacity exists to provision the requested network resources, wherein the configuring includes:
    installation of an operating system on the second physical server device, and
    re-setting one or more parameters associated with the second physical server device; and
  sending provisioning-related information to the web portal connection, to notify the user that the second physical server device has been provisioned.

2. The method of claim 1, wherein configuring the second physical server device includes at least one of:
  provisioning network components; or
  provisioning storage.

3. The method of claim 2, wherein provisioning storage includes:
  obtaining a storage area from a storage area network (SAN) device; or
  obtaining a storage area from a network attached storage (NAS) device.

4. The method of claim 1, further comprising:
  creating a job description of subtasks for provisioning the second physical server device;
  placing the job description in a queue; and
  polling the queue to obtain the job description and to perform the subtasks.

5. The method of claim 1, further comprising validating the input parameters by determining:
  whether an Internet Protocol address is available for provisioning.

6. The method of claim 1, wherein the configuring further comprises:
  provisioning an application on the second physical server device.

7. The method of claim 6, wherein provisioning an application includes:
  allocating storage space on the second physical server device for installing the application;
  installing the application; and
  reconfiguring network components of the second physical server device corresponding to the re-set one or more parameters.

8. The method of claim 1, further comprising:
  de-provisioning, based on user input received via the web portal connection, the second physical server device.

9. The method of claim 1, wherein creating the virtual machine further includes:
  instructing a hypervisor manager to install the hypervisor on the first physical server device.

10. The method of claim 1, further comprising:
  recording configuration information in a configuration management database at a database device.

11. The method of claim 1, wherein the one or more parameters include:
  parameters designating an amount of disk space to be provided to the second physical server device;
  kernel parameters;
  a semaphore count; and
  an upper limit on memory.

12. The method of claim 1, wherein creating the virtual machine includes:
  configuring at least one of a virtual load balancer, a virtual firewall, or a virtual local area network (VLAN).

13. The method of claim 1, further comprising:
  accessing a network through an administrator portal device via a browser interface.

14. A non-transitory computer-readable medium comprising computer-executable instructions, the computer-executable instructions including instructions for:
  receiving, via a web portal connection to an integrated provisioning system, parameters input by a user associated with a request for requested network resources, an identified number of virtual machines, and an identified number of physical devices on a network;
  transforming the input parameters into one or more network parameter values for access by the integrated provisioning system;
  determining, based on the identified number of virtual machines and the identified number of physical devices, that sufficient network capacity exists to provision the requested network resources;
  instructing a hypervisor manager controller to select a least used cluster of hypervisors within a portion of the network;
  causing, based on the one or more network parameter values and without manual intervention, a hypervisor of the selected cluster of hypervisors to instantiate at least one virtual machine on at least a first physical device in response to determining that sufficient network capacity exists to provision the requested network resources;
  configuring, based on the one or more network parameter values, parameters that are to be re-set for one or more components provided in at least a second physical device in response to determining that sufficient network capacity exists to provision the requested network resources;

installing an operating system, for the second physical device, on the second physical device based on the one or more network parameter values and without manual intervention in response to determining that sufficient network capacity exists to provision the requested network resources;

installing, based on the one or more network parameter values, an application on the second physical device and without manual intervention in response to determining that sufficient network capacity exists to provision the requested network resources; and sending provisioning-related information to the web portal connection, to notify the user that the second physical server device has been provisioned.

15. The non-transitory computer-readable medium of claim 14, wherein the computer-executable instructions include instructions for:

causing a virtual machine manager controller to send instructions to the hypervisor to instantiate the virtual machine.

16. The non-transitory computer-readable medium of claim 14, wherein the instructions for configuring include instructions for:

allocating storage resources of a network for the second physical device; and recording inventory of the storage resources in a database.

17. The non-transitory computer-readable medium of claim 14, further comprising instructions for:

generating a job description that is associated with provisioning the second physical device; and using the job description to perform workflow tasks associated with provisioning the second physical device.

18. The non-transitory computer-readable medium of claim 17, wherein the workflow tasks include at least one of:

provisioning an Ethernet card for the second physical device; or assigning the second physical device to a virtual local area network.

19. The non-transitory computer-readable medium of claim 14, further comprising instructions for:

applying, based on the one or more network parameter values, patches at the second physical device.

20. A system comprising:

one or more processors;

a web interface including one or more processors configured to:

receive parameters values, from a client device, corresponding to network resources associated with instantiation of a user-identified number of virtual machines and provisioning of a user-identified number of physical devices on a network;

transform the parameter values into one or more network values for access by one or more provisioning-related devices; and a provisioning-related device executing on the one or more processors configured to:

determine, based on the user-identified number of virtual machines and the user-identified number of physical devices, that sufficient network capacity exists to instantiate the user-identified number of virtual machines and to provision the user-identified number of physical devices, instruct a hypervisor of a selected, most used cluster of hypervisors within a portion of the network, to instantiate, based on the one or more network values and without manual intervention, the user-identified number of virtual machines on a network device in response to the determination that sufficient network capacity exists, provision, based on the one or more network values and without manual intervention, the user-identified number of physical devices for providing network resources requested by the client device in response to the determination that sufficient network capacity exists;

configure, based on the one or more network values, parameters that are to be re-set for one or more components provided in the user-identified number of physical devices during an installation of an operating system on the physical device, and send provision-related information to notify the client device that the user-identified number of physical devices has been provisioned.

* * * * *